United States Patent [19]

Kelman et al.

[11] Patent Number: 5,370,417

[45] Date of Patent: Dec. 6, 1994

[54] AUTOMOTIVE KNEE BOLSTER

[75] Inventors: Josh Kelman, Dover; John Gray, Union, both of N.H.; John Ribick, Northville; Dennis Marion, White Lake, both of Mich.

[73] Assignee: Davidson Textron Inc., Dover, N.H.

[21] Appl. No.: 229,006

[22] Filed: Apr. 18, 1994

[51] Int. Cl.⁵ ............................................. B60R 21/04
[52] U.S. Cl. ................................... 280/751; 280/752
[58] Field of Search ................... 280/751, 752, 748; 296/70; 180/90

[56] References Cited

U.S. PATENT DOCUMENTS

| | | | |
|---|---|---|---|
| 3,930,665 | 1/1976 | Ikawa | 280/751 |
| 3,984,128 | 10/1976 | Dehm et al. | 280/751 |
| 4,032,175 | 6/1977 | Aibe et al. | 280/751 |
| 4,065,157 | 12/1977 | Abe et al. | 280/751 |
| 4,400,011 | 8/1983 | Matsuno | 280/748 |
| 4,427,215 | 1/1984 | Weichenrieder et al. | 280/752 |
| 4,709,943 | 12/1987 | Yoshimura et al. | 280/751 |
| 4,834,422 | 5/1989 | Oikawa et al. | 280/751 |
| 4,893,834 | 1/1990 | Honda et al. | 280/751 |
| 4,934,736 | 6/1990 | Huisman | 280/752 |
| 4,978,136 | 12/1990 | Tomita et al. | 280/751 |
| 5,156,416 | 10/1992 | Frank | 280/751 |
| 5,163,730 | 11/1992 | Welch | 280/751 X |

FOREIGN PATENT DOCUMENTS 4003952  8/1991  Germany ................... 280/751

Primary Examiner—Karin L. Tyson
Assistant Examiner—Christopher P. Ellis
Attorney, Agent, or Firm—Reising, Ethington, Barnard, Perry & Milton

[57] ABSTRACT

An instrument panel for an automotive vehicle includes a substructure that extends across the width of an automotive vehicle passenger compartment and is secured to side pillars of an automotive vehicle body. A pair of laterally spaced knee bolsters each include a retainer that has a rearwardly facing wall that is located at knee height, and a pair of integrally attached, vertically spaced struts that are attached to a lower channel of the substructure to form a first box structure for absorbing impact energy. A front channel is disposed in front of the lower channel and securely attached to the substructure of the instrument panel. The attached channels provide a cross car duct for wiring or air distribution and a second box structure for absorbing energy when the knee bolster is impacted in a vehicle collision.

3 Claims, 1 Drawing Sheet

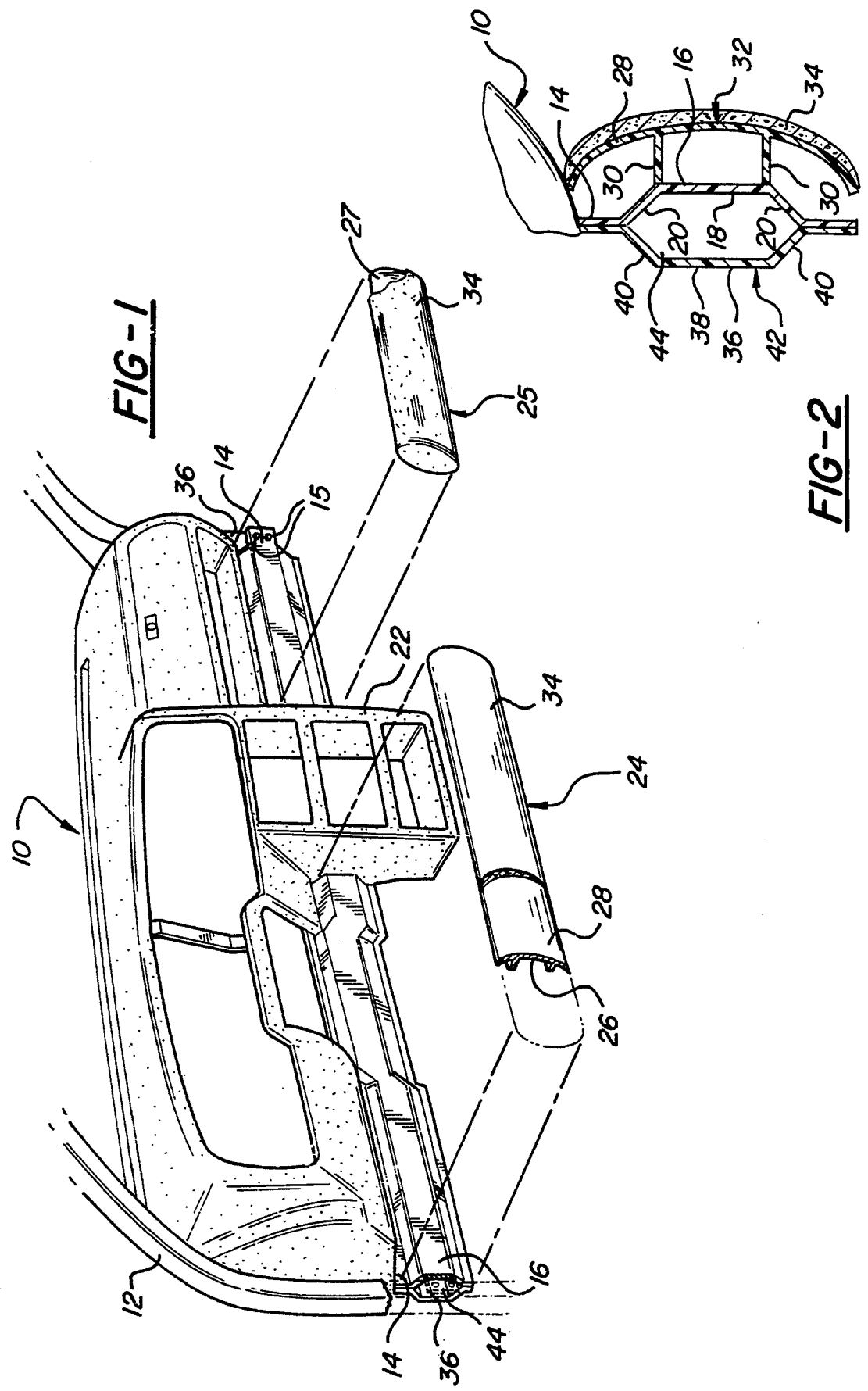

AUTOMOTIVE KNEE BOLSTER

BACKGROUND OF THE INVENTION

This invention relates generally to automotive vehicles and more particularly to an automotive instrument panel for an automotive vehicle that includes a knee bolster for protecting the knees of front seat occupants in the event of a collision.

Federal Motor Vehicle Safety Standard 208 mandates that the lower instrument panel of an automobile prevent knee damage in a thirty (30) mile per hour vehicle impact.

Conventional approaches use an open cell or resilient foam on a steel backed plastic or composite plate. See for instance U.S. Pat. No. 4,394,736 granted to Marinus Huisman Jun. 19, 1990 for a knee restraining device comprising an inflexible, hollow support member and a flexible deformation element that includes a sheet metal shell and a foam layer.

Other approaches utilize permanent or non-elastic deformation of structural members. For instance, U.S. Pat. No. 4,978,136 granted to Norihiro Tomita et al Dec. 18, 1990 discloses an automotive knee protector comprising plates that are attached to V-shaped arms by shock absorbing members that are deformed responsive to a crash.

Another example is U.S. Pat. No. 4,400,011 granted to Yoshio Matsuno Aug. 23, 1983 which discloses a vehicle body construction comprising knee restraining members that are channel-shaped and collapsible or deformable non-elastically. The members are preferably covered with a suitable padding.

SUMMARY OF THE INVENTION

The object of this invention is to provide an instrument panel that has knee bolsters that absorb impact energy primarily by elastic deformation of structural components.

A feature of the invention is that the instrument panel incorporates a "double box" approach that absorbs knee impact energy effectively.

Another feature of the invention is that the instrument panel incorporates back-to-back structural boxes that deform in three dimensions to absorb knee impact energy effectively.

Yet another feature of the invention is that the instrument panel includes a knee bolster retainer that cooperates with a substructure of the instrument panel to provide a box structure for absorbing impact energy.

Still yet another feature of the invention is that the instrument panel includes a structural member that cooperates with a substructure of the instrument panel to provide a box structure for absorbing impact energy and to provide a cross car duct for wiring or air distribution.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 1 is an exploded perspective partial view of an automotive vehicle having an instrument panel that includes a knee bolster in accordance with the invention; and FIG. 2 is a section of the instrument panel taken substantially along the line 2—2 of FIG. 1 looking in the direction of the arrows.

DESCRIPTION OF THE INVENTION

Referring now to the drawing, FIG. 1 shows a portion of an automotive vehicle at the front of the passenger compartment comprising an instrument panel 10. The instrument panel 10 extends across the width of the passenger compartment and is secured to side pillars 12 of the automotive vehicle body construction commonly referred to as "A" pillars in a conventional manner.

The instrument panel 10 comprises a substructure 14 that forms a cross car structural member of the vehicle body construction when it is secured to the side pillars 12. The substructure 14 may be secured in any suitable manner, for instance by bolts 15.

The substructure 14 is preferably molded of a tough unfilled structural thermoplastic material, such as polycarbonate/acrylonitrile-butadiene-styrene (PC/ABS). The substructure 14 may also be made of metal, a plastic composite or any other automotive structural material.

The substructure 14 includes a lower channel 16 comprising a back wall 18 and sloped side walls 20 or other suitable shape for cooperatively forming a box structure. The channel 16 extends across the width of the passenger compartment and includes a central portion that is behind a center stack 22 of the instrument panel 10 that is provided for accessories such as a radio; a tape or disk player; controls for a heating, ventilating and air conditioning (HVAC) system, etc. An offset portion of the channel 16 on the driver's side accommodates a steering column (not shown). The substructure 14 may also be secured to the center stack 22.

The instrument panel 10 includes a pair of knee bolsters 24 and 25 that are located on opposite sides of the center stack 22 and that comprise retainers 26 and 27 respectively. The retainers 26 and 27 have a curved convex wall 28 that faces rearwardly toward the front seat occupants seated behind the instrument panel 10. The rearward facing wall 28 is located at knee height. The knee bolster retainers 26 and 27 may be separate molded parts as shown or an integral lower extension of the retainer of the instrument panel 10.

The retainers 26 and 27 further comprise a pair of integrally attached, vertically spaced struts 30 that extend forwardly and are attached to the corners of the lower channel 16 as best shown in FIG. 2. The struts 30 are securely attached to the lower channel 16 in any suitable manner, for example by adhesive as shown or mechanical fasteners or the like. Each knee bolster retainer 26 and 27 thus forms a first box structure 32 of generally rectangular shape in conjunction with the lower channel 16 for absorbing impact energy as explained below. Furthermore, this design also allows several bolsters to fit substructure 14 so that several different styles can be provided for a car line using a single substructure.

The knee bolster retainers 26 and 27 may be made of any structural thermoplastic material that is compatible with the material of the substructure 14. Examples of suitable materials are polycarbonate/ABS, polypropylene (PP) and polyurethane (PU).

The knee bolsters 24 and 25 may include a suitable decorative covering 34 which conventionally comprises a soft flexible skin of a plastic material such as polyvinyl chloride or urethane. An expanded polyvinyl chloride or urethane material that has an integral backing layer of resilient foam may be used instead to enhance the softness of the decorative covering 34 if desired. A separate layer of resilient urethane foam or the like can also be used in place of or in addition to the integral backing layer for an enhanced cushioning effect.

The instrument panel 10 further comprises another structural member in the form of a front channel 36 that may be a mirror image of the lower channel 16 of the substructure 14 of the instrument panel 10. This front channel 36 comprises a front wall 38 and sloping side walls 40 that extend across the width of the passenger. The front channel 36 is disposed in front of the lower channel 16 and it is securely attached to the instrument panel substructure 14 in any suitable manner, for example, by fusing mating flange portions at the free ends of the side walls 20 and 40. The front channel 36 which may be a structural plastic such as PC/ABS or a metal such as steel or a combination of both serves two important functions. It provides a duct close out for the lower channel 16 of the instrument panel 10 so that a cross car duct 44 for wiring or for air distribution in connection with the heating, ventilating and air conditioning (HVAC) system of the vehicle is provided by the two channels 16 and 36.

The front channel 36 also provides a second box structure 42 of generally hexagonal shape in conjunction with the lower channel 16 of substructure 14 for absorbing energy when the knee bolster 24 or 25 is impacted in a vehicle collision. Channel 36 and substructure 14 are both structural members. Either or both may extend up vertically to provide structural support for the instrument panel 10 above the knee bolster area.

When a conventional knee bolster is impacted in a vehicle collision, the energy is absorbed primarily by deflection of resilient foam with some deformation of structural components. On the other hand, when the knee bolster 24 or 25 is impacted in a vehicle collision, the resulting energy is absorbed primarily by elastic deformation of structural components material with some deflection since the back-to-back box structures 32 and 42 deform in three dimensions. This reduces the amount of deflection that is necessary in conventional knee bolsters and saves space so that the knee bolsters do not need to protrude as far into the passenger compartment.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An instrument panel for an automotive vehicle comprising:
    a substructure that is adapted to extend across the width of an automotive vehicle passenger compartment and that is adapted for being secured to side pillars of an automotive vehicle body,
    the substructure including a lower portion that is adapted to extend across the width of the vehicle passenger compartment,
    a pair of laterally spaced knee bolsters comprising a retainer that has a rearwardly facing wall that is located at knee height,
    the retainer having vertically spaced struts that are attached to the lower portion of the substructure to form a first box structure for absorbing impact energy, and
    a member that is adapted to extend across the width of the vehicle passenger compartment and is securely attached to the lower portion of the substructure of the instrument panel so that a second box structure for absorbing energy when the knee bolster is impacted in a vehicle collision is provided.

2. An instrument panel for an automotive vehicle comprising:
    a substructure that is adapted to extend across the width of an automotive vehicle passenger compartment and that is adapted for being secured to side pillars of an automotive vehicle body,
    the substructure including a lower channel that is adapted to extend across the width of the vehicle passenger compartment,
    a pair of laterally spaced knee bolsters comprising a retainer that has a rearwardly facing wall that is located at knee height,
    the retainer having a pair of vertically spaced struts that extend forwardly and are attached to the lower channel to form a first box structure for absorbing impact energy, and
    a front member that is adapted to extend across the width of the vehicle passenger compartment and securely attach to the substructure of the instrument panel so that a cross car duct for wiring or air distribution and a second box structure for absorbing energy when the knee bolster is impacted in a vehicle collision are provided.

3. An instrument panel for an automotive vehicle comprising:
    a substructure that is adapted to extend across the width of an automotive vehicle passenger compartment and that is adapted for being secured to side pillars of an automotive vehicle body,
    the substructure including a lower channel having a back wall and sloped side walls that are adapted to extend across the width of the vehicle passenger compartment,
    a pair of laterally spaced knee bolsters comprising a retainer that has a curved convex wall that faces rearwardly toward front seat occupants behind the instrument panel and that is located at knee height,
    the retainer having a pair of integrally attached, vertically spaced struts that extend forwardly and are attached to the corners of the lower channel to form a first box structure of generally rectangular shape in conjunction with the lower channel for absorbing energy, and
    a front channel that is a mirror image of the lower channel of the substructure of the instrument panel,
    the front channel having a front wall and sloping side walls that are adapted to extend across the width of the vehicle passenger compartment,
    the front channel being disposed in front of the lower channel of the instrument panel and securely attached to the substructure of the instrument panel so that a cross car duct for wiring or for air distribution and a second box structure of generally hexagonal shape for absorbing energy when the knee bolster is impacted in a vehicle collision are provided by the two channels,
    the first and second box structures being disposed back-to-back.

* * * * *